United States Patent [19]

Woelffer et al.

[11] 4,108,456
[45] Aug. 22, 1978

[54] LAWN MOWER HANDLE MOUNTING

[75] Inventors: Neill Carl Woelffer, Racine; Merlin Howard Grandrud, Sturtevant, both of Wis.

[73] Assignee: Jacobsen Manufacturing Company, Racine, Wis.

[21] Appl. No.: 815,815

[22] Filed: Jul. 15, 1977

[51] Int. Cl.² .................................................. B62B 3/00
[52] U.S. Cl. .......................... 280/47.37 R; 16/111 A; 56/DIG. 18
[58] Field of Search ............................... 280/47.37 R; 56/DIG. 18; 16/111 A

[56] References Cited

U.S. PATENT DOCUMENTS

| 2,624,168 | 1/1953 | Clemson | 56/DIG. 18 |
| 2,727,753 | 12/1955 | Johnson et al. | 280/47.37 R |
| 2,900,660 | 8/1959 | Wuerker, Jr. | 16/111 A |
| 3,116,937 | 1/1964 | Price | 280/47.37 R |
| 3,154,336 | 10/1964 | Nelson | 280/47.37 R |
| 3,243,196 | 3/1966 | Amis | 280/47.37 R |
| 3,357,716 | 12/1967 | Musichuk | 280/47.37 R |
| 3,462,924 | 8/1969 | Price et al. | 56/DIG. 18 |
| 3,817,547 | 6/1974 | Erickson | 280/47.37 R |

Primary Examiner—Robert R. Song
Attorney, Agent, or Firm—Arthur J. Hansmann

[57] ABSTRACT

A lawn mower handle mounting wherein a mower has a handle attached thereto and the handle includes two end portions pivotally mounted to the mower. A projection extends on the mower adjacent the pivot axis of the handle and the handle can slide over the projection to be disposed therebelow and the handle is spring-biased to be retained underneath the projection. A rib extends underneath the projection at an angle to engage the upper edge of the handle, and a block extends below the handle so that the handle is secure and snug between the rib and the block, as urged thereagainst by the spring action mentioned. A pivot pin interconnects the handle and the mower and allows the handle to be sprung from underneath the projection and free thereof so that the handle can be pivoted upwardly relative to the mower, when desired.

7 Claims, 5 Drawing Figures

LAWN MOWER HANDLE MOUNTING

This invention relates to a lawn mower handle mounting, and, more particularly, it relates to a pivotal mounting for a handle on a lawn mower so that the handle can be in a set but releasable position relative to the mower and it can be released from that position for pivoting on the mower.

BACKGROUND OF THE INVENTION

The prior art is already aware of various handle constructions which are pivotally attached to the mower and which can be secured in a non-pivoted but releasable position, as desired. These are the handles which are commonly employed for steering or pushing and pulling relative to the mower itself, and they exist on both reel type mowers and rotary type mowers. Examples of prior art mower handles are found in U.S. Pat. Nos. 2,624,168 and 2,727,753 and 2,900,660 and 3,116,937 and 3,243,196 and 3,357,716 and 3,462,924 and 3,817,547. Those prior art patents all show handles pivotally mounted on mowers, and they also show means for releasably securing the handle in a set position relative to the mower so that the mower can be steered and the like. All of the afore-mentioned patents, except for the first one, relate to a rotary lawn mower, and the handles employ spaced-apart legs which are pivotally attached to the mower on pivot pins or the like. Further, U.S. Pat. Nos. 2,727,753 and 3,116,937 and 3,462,924 all show arrangements where the handle is limited in its pivotal movement in one direction. Still further, U.S. Pat. Nos. 3,243,196 and 3,817,547 are examples of mower handles attached to the mower in a set position but with the handle releasable so that it can freely pivot relative to the mower. Still further, U.S. Pat. No. 3,243,196 shows the handle pivot mounting arrangement wherein the handle has its attached ends spring-urged normally outwardly so that a pin and handle height alignment hole can be inter-engaged to adjust the height of the handle at its grip end.

The present invention entails the arrangement of the handle which is normally spring-urged outwardly at its lower ends which are attached to the mower, and a pin interconnecting the handle and the mower permit the handle to move laterally of the mower for alternate secure positioning when the handle is in the lower pivoted position for mowing and to permit the handle to be relieved of the secure position when the handle is urged inwardly against its spring force to thereby permit the handle to pivot upwardly on the mower and out of the mowing position.

In the present invention, the object and advantage is to have a simplified type of handle mounting which does not require separate parts, does not require specific alignment of pins and holes for setting the handle in a desired fixed position relative to the mower, but which also permits the handle to be readily released from its set position, simply by overcoming the spring tension in the handle when the handle legs are urged toward each other and free from their engaged portions of the mower itself. Accordingly, the present invention provides an improvement on mower handle mountings and does not require separate brackets or straps or aligned pins or holes for achieving the desired set position for mowing and the released position for either removing the handle or for folding the handle relative to the mower such as in U.S. Pat. Nos. 2,727,753 and 3,357,716 and 3,462,924.

Still further, it is an object of this invention to provide a mower handle mounting which inherently and automatically achieves a snug and firmly set position of the handle to the mower in the mowing position. This particular objective is achieved by employment of a spring-biased type of handle wherein the handle legs are urged outwardly and against an inclined surface which urges the handle against a surface on the opposite side of the handle, all for the snug and secure mounting mentioned. Still further, the handle mounting arrangement of this invention permits the handle to be readily released from its firm snug and set position, such as when the handle is to be removed from the mower or simply folded relative thereto.

Other objects and advantages will become apparent upon reading the following description in light of the accompanying drawings.

DETAILED DESCRIPTION OF THE PREFERRED EMBODIMENT

Figure 1:
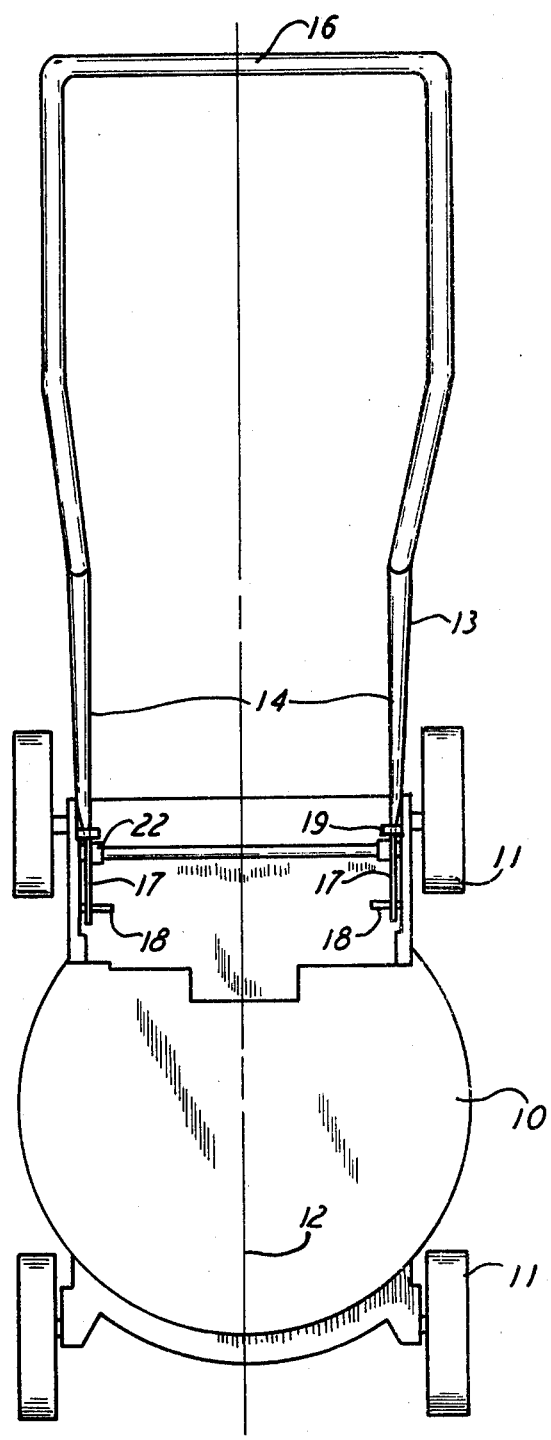
FIG. 1 is a top plan view of a mower with a handle attached and with the handle mounting of this invention.

FIG. 1 shows a conventional type of rotary mower 10 having ground wheels 11 for mobilizing the mower in the fore-and-aft direction along the centerline designated 12, all in the usual arrangement of a rotary mower. A handle 13 is attached to the mower 10 and generally consists of two ends or legs 14 and an interconnecting cross piece 16, all for presenting a U-shaped handle of a generally customary configuration.

Figure 2:
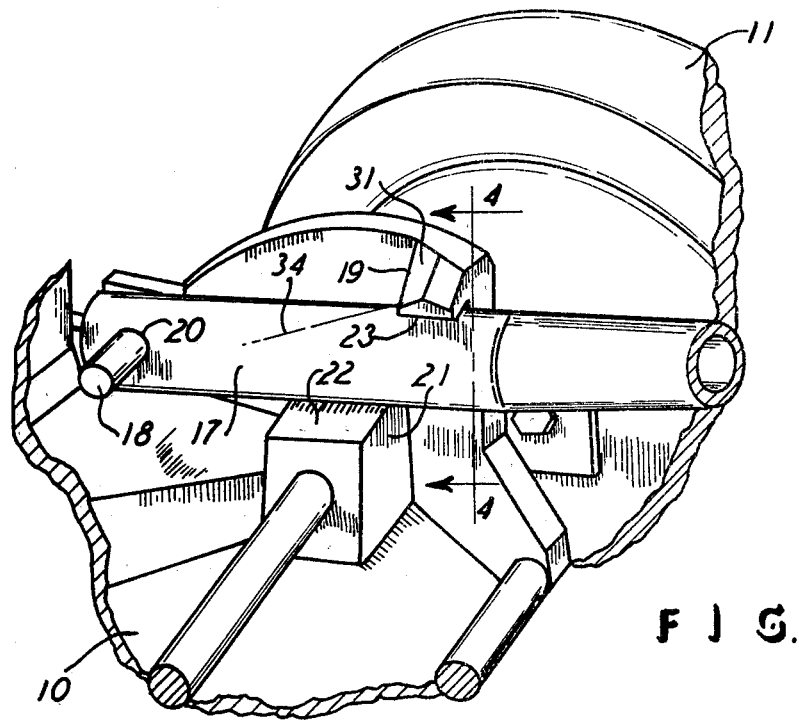
FIGS. 2 and 3 are enlarged perspective views of the handle mounting of FIG. 1, and with the handle in two different positions.
Figure 3:
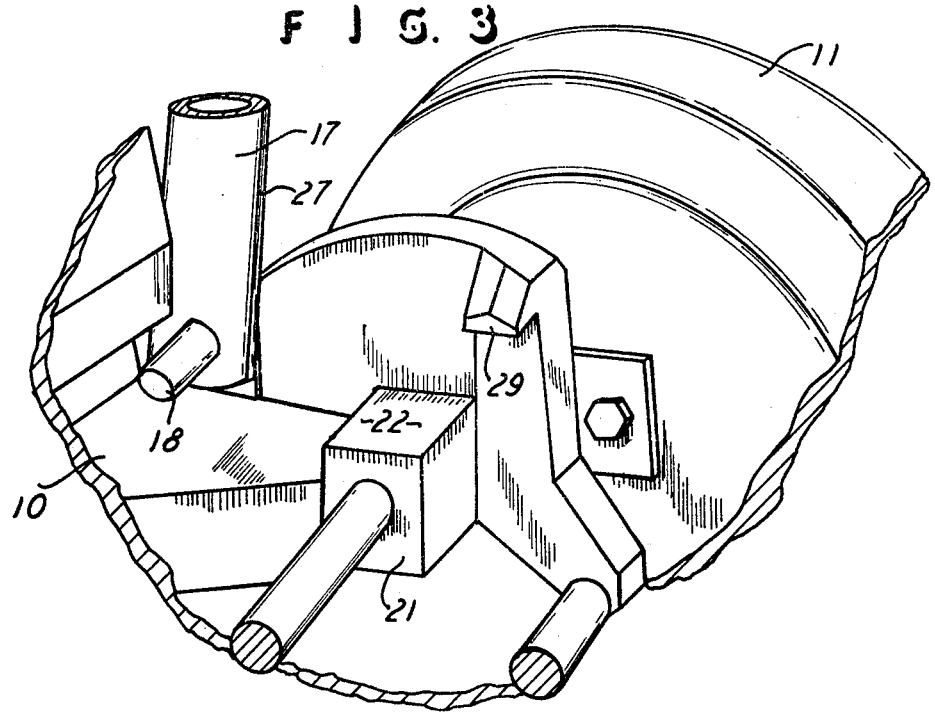

It will of course then be understood that the operator can grip the handle portion 16 and guide the mower in the steering thereof and generally along the fore-and-aft axis or direction 12, and the handle of FIG. 1 is shown in the mowing position, and that is also the position of the showing in FIG. 2 while FIG. 3 shows the handle in the inoperative or raised position. It should also be understood that the handle lower ends or legs 14 are substantially horizontally directed in the mowing position, and the remainder of the handle up to the grip 16 is uprightly directed to a height for normal gripping by the operator during mowing.

FIGS. 1, 2, and 3 show the handle legs 14 to have flattened ends 17 which engage a fixed pin 18 suitably mounted on the mower 10 and extending inwardly toward the mower centerline 12. The handle 13 is of course pivotal on the two axially-aligned pins 18, and of course the handle flattened ends 17 have circular openings 20 for pivotal mounting on the pins 18. Further, the handle 13 is arranged to have its legs spring-biased outwardly and laterally to the sides of the mower 10 and thus away from the mower centerline 12, and thus the handle ends or legs 14 remain on the pins 18 until the spring force is overcome by pulling the legs 14 toward each other until the ends 17 clear the pins 18, when it is desired to remove the handle 13 from the mower 10.

However, the spring force inherent in the handle 13 is sufficient to keep the handle legs 14 extended laterally outwardly of the mower 10 and to keep them secure with the mower 10 in a manner hereinafter described.

FIGS. 2 through 5 show the specific arrangement for the mower mounting, and it will be understood that that arrangement exists on both sides of the mower 10, such as shown in FIG. 1. Accordingly, each side of the mower 10 has a projecting piece 19 extending inwardly on the mower and being fixed thereon. Also, each side of the mower has a piece 21 affixed with the mower and presenting a horizontal surface 22 which is at an elevation below the lower surface 23 of the projection 19. Thus, generally speaking, the space between the surfaces 22 and 23 accommodates the vertical dimension of the mower flattened ends 17, and the mower handle can then be positioned between the surfaces 22 and 23 in the mowing position shown in FIG. 2. Therefore, the surfaces 22 and 23 are in line with the pin 18 in the fore-and-aft direction of the mower and in the vertical plane, and thus the handle legs 14 are held snug by the pin 18 and the surface 22 and the projection 19, in a manner hereinafter described. FIG. 1 shows that the pin 18 and the surface 22 and the projection 19 are in separate vertical planes relative to the fore-and-aft direction of the mower 10, and thus the handle is securely held by those elements.

Figure 4:
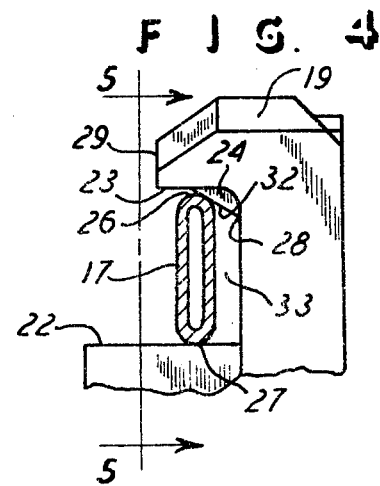
FIG. 4 is a sectional view taken along the line 4—4 of FIG. 2.
Figure 5:
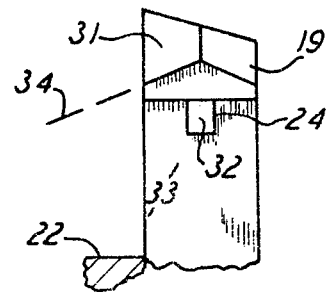
FIG. 5 is a sectional view taken along the line 5—5 of FIG. 4.

FIGS. 4 and 5 show that the projection 19 has an inclined surface or ramp 24 therebelow and faced generally toward the center plane of the mower 10 for contacting the upper surface 26 of the handle flattened end 17 while the mower surface 22 contacts the handle lower surface 27. Thus the height dimension of the mower handle flattened ends 17 between the limit surfaces 26 and 27 is intermediate the distance between the surfaces 22 and 23 and the shorter distance between the surface 22 and the lower end of the ramp 24 at its end 28. That is, the handle flattened ends 17 will always engage the ramp 24 and the surface 22 when the handle flattened ends 17 are urged laterally of the mower, such as by the spring bias inherent in the handle 13 and causing the legs 14 to spread apart, as mentioned and described above. As such, the handle 13 is always in a snug and set position relative to the mower and there is no looseness or rattle between the handle 13 and the mower 10, though no straps or bolts or the like are required to achieve that firm and snug set position which is also readily releasable as described hereinafter.

To release the handle 13 from its set position shown, the legs 14 only need to be pulled toward each other against the spring tension in the handle 13 until the flattened ends 17 extend beyond the inwardly disposed edges 29 of the projections 19, and the handle 13 can then be pivoted upwardly to the position shown in FIG. 3. Further, to again reposition the handle in the mowing position of FIG. 2, the handle need only be forced downwardly at its grip end 16 until the flattened portions 17 engage the upper surface of the projection 19, and the handle end 17 will then slide along the inclined surfaces 31 on the top of the projections 19 to thus urge the flattened ends 17 inwardly on the mower 10 while still retaining the handle end 17 on the pivot pins 18. Of course eventually the flattened ends 17 will slide down the incline 31 and clear the ends 29 and then slip into the position shown in FIGS. 2 and 4. Thus, the wedge 24 presents the inclined surface 32, and the handle engages the surfaces 22 and 32 which present a wedge-shaped space therebetween for reception of the handle ends 14, as shown and described. FIG. 4 also shows the handle is spaced from the mower portion which is to the right of the handle, by the space designated 33, and that mower portion defines the bottom of the wedge-shaped space.

Throughout the arrangement and positioning described, the pins 18 are horizontally disposed and are of a length sufficient to accommodate the sliding of the handle ends above and below the member 19 and past its surface 29 without having the handle come off the pin 18 which is therefore in line with the surfaces 22 and 32 as the length of the pin 18 is sufficient to accommodate the actions described and to present the structures as shown.

Accordingly, the mounting includes the pivot interconnection between the lawn mower handle and the mower itself, and it includes the surfaces 22 and 32 which present the wedge-shaped space 33 of which the greatest dimension is greater than the overall height of the handle flattened end 17, for the snug mounting shown in FIG. 4. Also, the mower includes the projection 19 with the inclined surface 31 down which the handle lower edge 27 will slide for moving around the projection end 29 and into the operative position shown in FIGS. 2 and 4, and that inclined surface 31 is also inclined in the direction of the pivot pin 18 so that the handle lower edge 27 will be in full contact with the surface 31 as it slides therealong for snapping into the wedge-shaped space 33, as described and shown. That is, the line 34 shows the angulation of the surface 31 toward the pivot pin 18. Further, the length of the pin 18 is sufficient so that it will not restrict the outward movement of the handle legs 14 and they can and will become snugly engaged with the wedge surface 32 and the lower surface 22 in the operating position shown. Thus, FIG. 1 shows the aligned position of the pins 18 in the fore-and-aft direction of the mower and it also shows the length of the pins 18 so that the handle ends 14 can be set in their solid or snug position shown in FIG. 4 and the handle ends 14 can also be forced inwardly toward each other to clear the surfaces 29 but yet not come off the pins 18. Of course when it is desired to completely remove the handle 13 from the mower 10, then continued movement of the handle legs 14 toward each other will cause them to slide off the pivot pins 18. In the entire arrangement and mounting, no bolts or retainers or fasteners of any type are required, and simply the elements of the two axially aligned pivot pins 18 and the wedge-shaped spaces 33 are utilized for the immovable positioning of the handle legs 14, as described and shown.

What is claimed is:

1. A lawn mower handle mounting comprising a mower, a mower handle having two ends repsectively pivotally attached to opposite sides of said mower for up and down pivotal movement and with said ends being spring-urged in the horizontal direction toward the respective opposite sides of said mower, said ends each including a portion spaced from the pivot axis and with each said portion having a fixed vertical dimension, each side of said mower having two surfaces vertically spaced apart and disposed one above the other respectively above and below said handle portions and in contact therewith for securing said handle onto said mower, the respective ones of said two surfaces being angled relative to each other and presenting a wedge-shaped space therebetween and with a portion of each of said mower sides extending between said two surfaces and defining the bottom of said wedge-shaped space, and with the smaller dimension of said wedge-shaped space being less than said fixed vertical dimension of said leg portions, all for snug mounting of said handle by spring urging said leg portions into said wedge-shaped space and against said two surfaces while being spaced from the respective said mower portions.

2. The lawn mower handle mounting as claimed in claim 1, wherein the attachment of each of said handle ends to said mower incorporates a pivot pin with the axis thereof horizontally disposed.

3. The lawn mower handle mounting as claimed in claim 2, wherein the length of each of said pivot pins is greater than the depth of each of said wedge-shaped spaces, to have said handle portions snugly nest in said wedge-shaped spaces.

4. The lawn mower handle mounting as claimed in claim 1, including two inclined surfaces on said mower and respectively disposed above said wedge-shaped spaces and arranged for sliding said handle portions on said inclined surfaces to lead said handle portions into said wedge-shaped spaces when said handle is pivoted downwardly toward said wedge-shaped spaces.

5. The lawn mower handle mounting as claimed in claim 4, wherein said inclined surfaces are on respective planes directed toward and passing at least adjacent the pivot axis of said handle.

6. The lawn mower handle mounting as claimed in claim 1, including two pins on said mower and an opening in each of said handle ends for respectively slidably receiving said pins and thereby pivotally attach said handle to said mower, said pins each being longer than the depth of each of said wedge-shaped spaces for movement of said handle portions into positions against said two surfaces.

7. The lawn mower handle mounting as claimed in claim 6, including two inclined surfaces on said mower and respectively disposed above said wedge-shaped spaces and arranged for sliding said handle portions on said inclined surfaces to lead said handle portions into said wedge-shaped spaces when said handle is pivoted downwardly toward said wedge-shaped spaces.

* * * * *